Dec. 4, 1928.  
W. F. GRANT  
1,693,600  
OIL AND WATER CONTROL FOR HYDRAULIC TURBINE BEARINGS  
Filed March 9, 1928
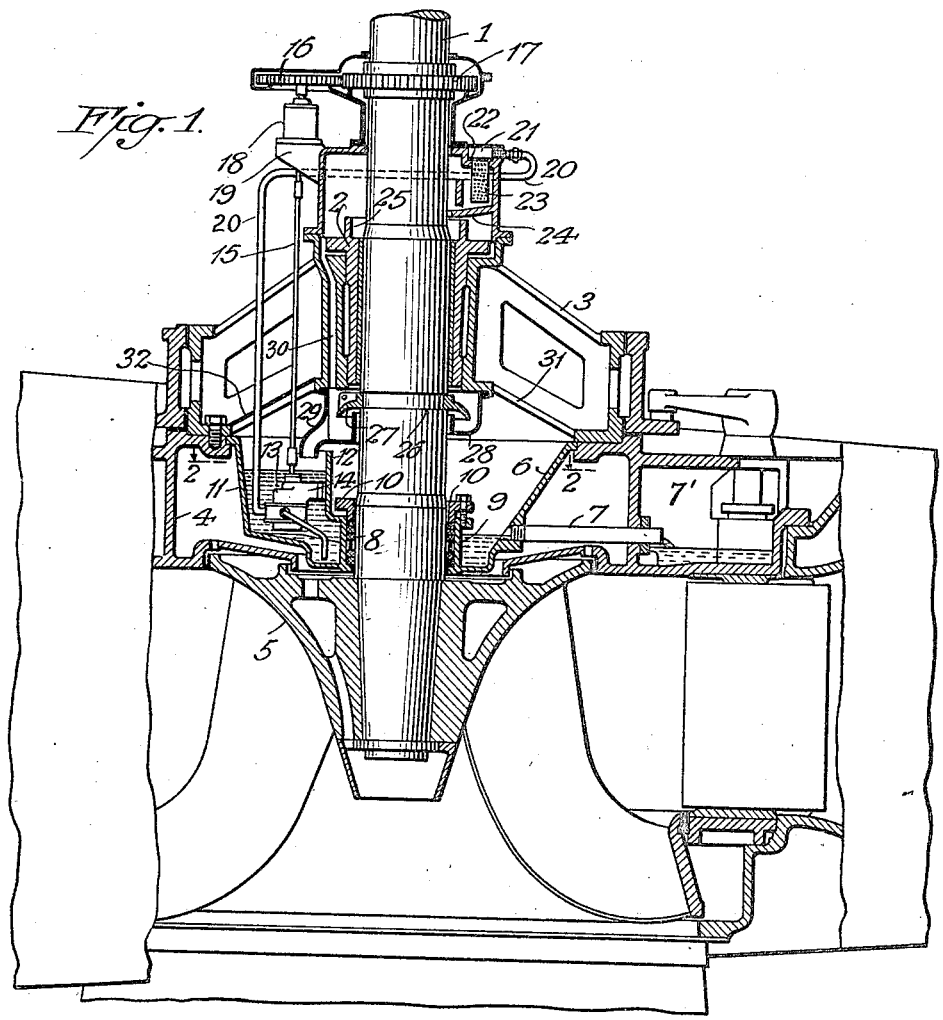
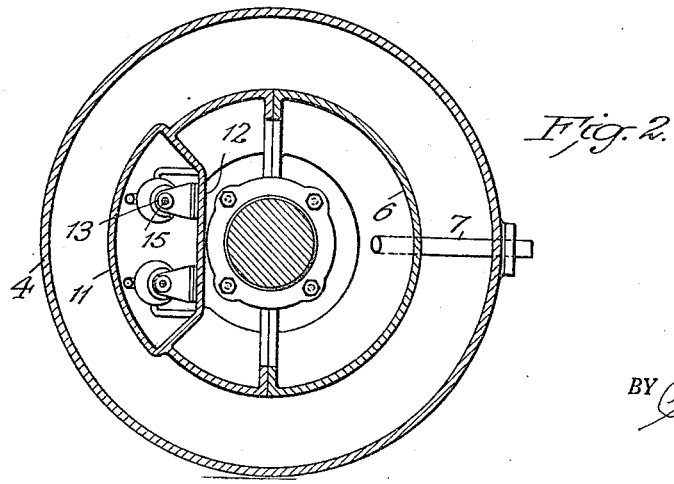
INVENTOR.  
WILLIAM F. GRANT.  
BY Sheffield & Betts  
HIS ATTORNEYS.

Patented Dec. 4, 1928.

1,693,600

UNITED STATES PATENT OFFICE.

WILLIAM F. GRANT, OF NEWPORT NEWS, VIRGINIA, ASSIGNOR TO NEWPORT NEWS SHIPBUILDING AND DRY DOCK COMPANY, A CORPORATION OF VIRGINIA.

OIL AND WATER CONTROL FOR HYDRAULIC-TURBINE BEARINGS.

Application filed March 9, 1928. Serial No. 260,447.

This invention relates to combined oil and water controls in connection with the bearings of hydraulic turbines and similar devices.

In the usual design of hydraulic turbines, it is customary to lubricate the main bearing for the turbine shaft with a continuous flow of oil which, after passing through the bearing, is usually collected in a suitable pan or receptacle, generally cylindrical or conical in form and positioned below the bearing and above the runner of the turbine. It is customary to provide in the oil pan or receptacle, some type of seal or gland around the main shaft of the turbine to prevent leakage of the oil or the entrance of water into the oil pan. Under certain conditions of operation pressure exists in the turbine casing below this seal and results in some leakage of water into the oil pan which mixes with the oil therein. Under certain other conditions of operation a suction exists in the turbine casing on the under side of the seal and causes some outward leakage of oil from the oil pan.

The principal object of the present invention, therefore, is to provide a combined oil and water pan having a compartment adapted to receive the oil as it flows from the main turbine bearing and having a compartment into which the water leaking from the turbine casing through the seal is caused to flow, the oil and water being kept separated and confined respectively to certain channels.

Another object of the invention is to provide means to cause the oil to flow continuously from the main turbine bearing and be directed into the oil compartment in such a manner that it does not come in contact with the water in the water compartment.

A further object of the invention is to provide means for raising the oil from the oil compartment below the turbine bearing to a suitable reservoir above the bearing.

Further objects of the invention will be apparent from the following description read in connection with the accompanying drawing in which Fig. 1 is a partial elevational view in cross-section of a turbine embodying a preferred form of the present invention; and Fig. 2 is a cross-sectional view taken substantially on the line 2—2 of Fig. 1.

In the drawing, the numeral 1 indicates the main shaft of the turbine which is adapted to rotate in a suitable bearing 2 supported in the housing or bearing support 3, which is bolted on top of the crown plate 4 of the turbine. The runner 5 is mounted upon the lower end of the main shaft 1 as illustrated in Fig. 1.

Below the bearing 2 and above the runner 5 a suitable water compartment 6, preferably conical as shown in Fig. 1, is provided. The water compartment 6 is provided with a suitable drain 7 through which water leaking into the compartment may escape.

Around the shaft 1 and within the water compartment 6, a seal 8 is provided consisting of a packing box 9 fitted with an adjustable gland 10. This arrangement permits of the use of an effective seal around the shaft. This packing box may under certain conditions of operation be subject to water pressure on the under side but whatever water leaks past the seal is collected in the water compartment 6 and escapes therefrom through the drain pipe 7, into the compartment 7' from which the water is removed by means of a siphon or ejector (not shown) which forms part of the usual turbine equipment.

The oil compartment 11 which is adapted to receive the oil flowing from the bearing 2 is likewise positioned below this bearing and above the runner 5 and is located adjacent the water compartment 6 as clearly illustrated in Fig. 2. The oil and water compartments constitute a substantially frustrum-shaped receptacle, consisting of two portions as shown in Fig. 2, cast integral or otherwise connected together and around the shaft 1. A partition 12 separates the oil from the water. The oil compartment 11 is made of ample size to carry a sufficient quantity of oil for the continuous supply of oil to the main bearing 2 of the turbine. It also contains at least one or more, preferably two pumps 13 adapted to pump the oil therefrom to a suitable reservoir adjacent the top of the main bearing 2. The pumps 13 may be supported by suitable brackets 14 extending outward from the baffle 12. One of the pumps is driven by a vertical shaft 15 having attached to its upper end a pinion 16 which is driven by the gear 17 mounted on the main shaft 1 of the turbine. The upper end of the shaft 15 is preferably supported in a bearing 18 mounted upon the bracket 19 as illustrated in Fig. 1. The other pump is preferably driven by independent means, such as by a motor which may be connected to the upper end of its respective pump shaft and is mounted on the bracket 19.

The oil is pumped through the pipe 20 from the oil well 11 to a suitable inlet chamber 21 above the main bearing, and its outlet 22 is provided with a strainer 23 adapted to remove impurities from the oil. The oil flows through the oil strainer 23, over a baffle 24 and thence into a reservoir 25 surrounding the main shaft 1 directly above the bearing 2. The oil after flowing through the bearing 2 comes in contact with a flanged member or deflector 27 which is suitably mounted in a groove 26 on the shaft 1 and which comprises a projecting flange having downwardly curved surfaces adapted to distribute the oil in a suitable oil receptacle or catcher 28 surrounding the shaft 1. The catcher 28 is mounted upon the under side of the bearing housing 3 and is provided with a spout 29 on one side, which spout is vertically above the oil compartment 11 as shown in Fig. 1. The oil, therefore, after passing through the main bearing 2 flows on the flanged member 27 thence into the catcher 28, through the spout 29 and into the oil compartment 11. A passageway 30 is provided adjacent the bearing 2 so that excess oil from the reservoir 25 at the top of the main bearing may flow therethrough into the oil receptacle 28 and from there into the oil compartment 11.

It will be observed from the drawing that the upper part of the packing box 9 is open to the atmosphere which prevents any suction of the oil out of the oil compartment 11 into the water compartment 6. Also with the arrangement of the apparatus as described herein, it is possible to adjust the packing gland 10 or repack the packing box 9 without dismantling the main bearing or disturbing the oil system for the bearing. The access to the packing box 9 is through the openings 31 in the bearing support or housing 3. A cover 32 is provided above the oil compartment 11 to prevent dust and dirt from getting into the oil.

From the above description, it will be seen that the oil continuously circulates by way of the pump or pumps 13, the pipe 20, strainer 23, plate 24, bearing 2, over the deflector 27, receptacle 28 through outlet 29 from which it is returned to the compartment 11. No oil is therefore lost by being drawn through the gland 10, in case of a reduced pressure below the runner and on the other hand any water which may be forced through the gland 10, because of an increased pressure below the same, is discharged without being mixed with the oil as heretofore.

It will be noted that the water pan 6 surrounds the packing box 9 and gland 10 and its top is substantially open and unobstructed except by the supports 3, the packing box being a part of and connected with the bottom of the pan 6. This is of great advantage over prior constructions where the gland has been rendered inaccessible by numerous parts and plates which prevent easy inspection and replacement when necessary.

Having thus described this form of the invention, it is to be understood that the invention is not limited to the details of form and the arrangements of parts shown, since it will be apparent to those skilled in the art that various changes may be made in the form and arrangement of parts disclosed herein without departing from the spirit and scope of the invention as set forth in the following claims.

What is claimed and desired to be protected by Letters Patent is:

1. In a hydraulic turbine having a central shaft, a main bearing, an oil supply for lubricating the same, a pan or receptacle comprising separate compartments adapted to contain oil and water respectively, a packing gland connected with the bottom of said receptacle and surrounding said shaft, the top of said receptacle being substantially unobstructed whereby said packing gland is rendered accessible, and means for conveying oil and water away from said receptacle.

2. In a hydraulic turbine having a central shaft, a main bearing adapted to support said shaft, an oil supply for lubricating the same, a pan or receptacle surrounding said shaft and a gland adjacent the lower end of said shaft, said pan or receptacle comprising separate compartments for oil and water, said water compartment being adapted to receive water leaking through said gland, means for conveying the oil from the main bearing to the oil compartment and means for conveying the oil from the oil compartment to the top of the bearing.

3. In a hydraulic turbine having a central shaft, a main bearing adapted to support the turbine shaft, an oil supply for lubricating the same, a pan comprising separate compartments for oil and water, means for conveying the oil from the main bearing to the oil compartment, said means comprising a receptacle surrounding said shaft below the main bearing, a gland adjacent the lower end of said shaft, means for preventing oil from flowing to said gland, and means for conveying the oil from the oil compartment to the top of the bearing.

4. In a hydraulic turbine having a central shaft, a main bearing adapted to support the turbine shaft, an oil supply for lubricating the same, a pan comprising separate compartments for oil and water, means for conveying the oil from the main bearing to the oil compartment, said means comprising a receptacle surrounding said shaft below the main bearing and a flanged member mounted on said shaft and adapted to direct the oil from the main bearing into said receptacle, a gland adjacent the lower end of said shaft, and means for conveying the oil from the oil compartment to the top of the bearing.

5. In a hydraulic turbine having a central shaft, a main bearing adapted to support the turbine shaft, an oil supply for lubricating the same, a pan surrounding said shaft and comprising separate compartments for oil and water, said water compartment being adapted to receive water leaking around said shaft from the turbine casing, means for conveying the oil from the main bearing to the oil compartment, said means comprising a receptacle surrounding said shaft below the main bearing and a flanged member mounted on said shaft adapted to direct the oil from the main bearing into said receptacle, and means for conveying the oil from the oil compartment to the top of the bearing.

6. In a hydraulic turbine having a central shaft, a main bearing adapted to support the turbine shaft upon which the runner is mounted, an oil supply for lubricating said shaft, a gland at the lower end of said shaft, a pan surrounding said shaft below the main bearing and below the top of said gland and comprising separate compartments for oil and water, said water compartment being adapted to receive water leaking through said gland, a drain for removing the water from said water compartment, means for conveying the oil from the main bearing to the oil compartment, said means comprising a receptacle surrounding said shaft below the main bearing, a flanged member mounted on said shaft adapted to direct the oil from the main bearing into said receptacle, said receptacle being provided with an outlet located above said oil compartment, and means for conveying the oil from the oil compartment to the top of the bearing.

WILLIAM F. GRANT.